(12) United States Patent
Waggoner et al.

(10) Patent No.: US 8,066,567 B2
(45) Date of Patent: Nov. 29, 2011

(54) JOYSTICK WITH CONTROL DAMPENING AND DETENT USING ELECTRORHEOLOGIC CYLINDER

(75) Inventors: Van Earl Waggoner, Asbury, IA (US); Eric Richard Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 1118 days.

(21) Appl. No.: 11/467,414

(22) Filed: Aug. 25, 2006

(65) Prior Publication Data

US 2008/0048515 A1 Feb. 28, 2008

(51) Int. Cl.
*G06F 17/00* (2006.01)
(52) U.S. Cl. .......................................... 463/38
(58) Field of Classification Search .............. 463/38–40; 188/267.1, 267.2, 378, 379
See application file for complete search history.

(56) References Cited

U.S. PATENT DOCUMENTS

| | | | |
|---|---|---|---|
| 5,353,839 A * | 10/1994 | Kordonsky et al. | 137/806 |
| 6,283,859 B1 | 9/2001 | Carlson et al. | |
| 6,339,419 B1 | 1/2002 | Jolly et al. | |
| 6,373,465 B2 | 4/2002 | Jolly et al. | |
| 6,390,252 B1 * | 5/2002 | Namuduri et al. | 188/267.2 |
| 6,510,929 B1 * | 1/2003 | Gordaninejad et al. | 188/267.2 |
| 6,614,420 B1 * | 9/2003 | An et al. | 345/161 |
| 6,749,048 B2 * | 6/2004 | Coombs | 188/322.17 |
| 6,761,243 B2 | 7/2004 | Stout et al. | |
| 6,953,108 B2 * | 10/2005 | Anderfaas et al. | 188/267.2 |
| 7,097,212 B2 | 8/2006 | Willats et al. | |
| 7,422,092 B2 * | 9/2008 | Hitchcock et al. | 188/267.2 |
| 7,584,685 B2 * | 9/2009 | Crist | 74/574.1 |
| 2002/0129988 A1 | 9/2002 | Stout et al. | |
| 2003/0135290 A1 | 7/2003 | Yao et al. | |
| 2004/0238300 A1 | 12/2004 | Cherney | |

* cited by examiner

*Primary Examiner* — Ronald Laneau
(74) *Attorney, Agent, or Firm* — Baker & Daniels LLP

(57) ABSTRACT

A control system including MR or ER fluid is used to control actuation. The control system is configured to engage or disengage operably coupled elements. A joystick control system for a vehicle includes a controller configured to control engagement of operably coupled elements.

23 Claims, 4 Drawing Sheets

JOYSTICK WITH CONTROL DAMPENING AND DETENT USING ELECTRORHEOLOGIC CYLINDER

FIELD OF THE INVENTION

The instant invention relates to the use of magnetorheologic or electrorheologic fluid for feel, dampening and/or detent of control systems, including joysticks. More specifically, the control system incorporates magnetorheologic or electrorheologic fluid to reversibly feedback, lessen and/or eliminate control.

BACKGROUND OF THE INVENTION

Magnetorheologic fluids (hereinafter "MR fluids") respond to an applied magnetic field with a change in rheological (flow of matter) property. The magnetorheological response of MR fluids results from the polarization induced in suspended particles by application of an external applied magnetic field. The particles form columnar structures which restrict the motion of the fluid, increasing viscous characteristics of the MR fluid.

Electrorheologic fluids (hereinafter "ER fluids") respond to an applied electric field with a change in rheological property. Similar to MR fluid, the electrorheological response results from the alignment of suspended particles by application of an external applied electrical field. The particles form columnar structures which restrict the motion of the fluid, increasing viscous characteristics of the ER fluid.

MR fluid properties have been used in limited commercial applications.

SUMMARY OF THE INVENTION

The invention comprises, in one form thereof, a control system. The control system includes a dashpot having either a MR fluid or an ER fluid and a controller operably coupled to the dashpot, the controller controlling actuation of
the dashpot by application of either a magnetic field to the MR fluid or an electric field to the ER fluid.

The invention comprises, in another form thereof, a control system for a vehicle. The control system for a vehicle includes a dashpot having either a MR fluid or an ER fluid and a controller operably coupled to the dashpot where the controller is configured to control engagement of the dashpot.

BRIEF DESCRIPTION OF THE DRAWINGS

The above mentioned and other features and objects of the invention, and the manner of attaining them, will become more apparent and the invention itself will be better understood by reference to the following description of an exemplary embodiment of the invention taken in conjunction with the accompanying drawings, wherein.

Figure 1:
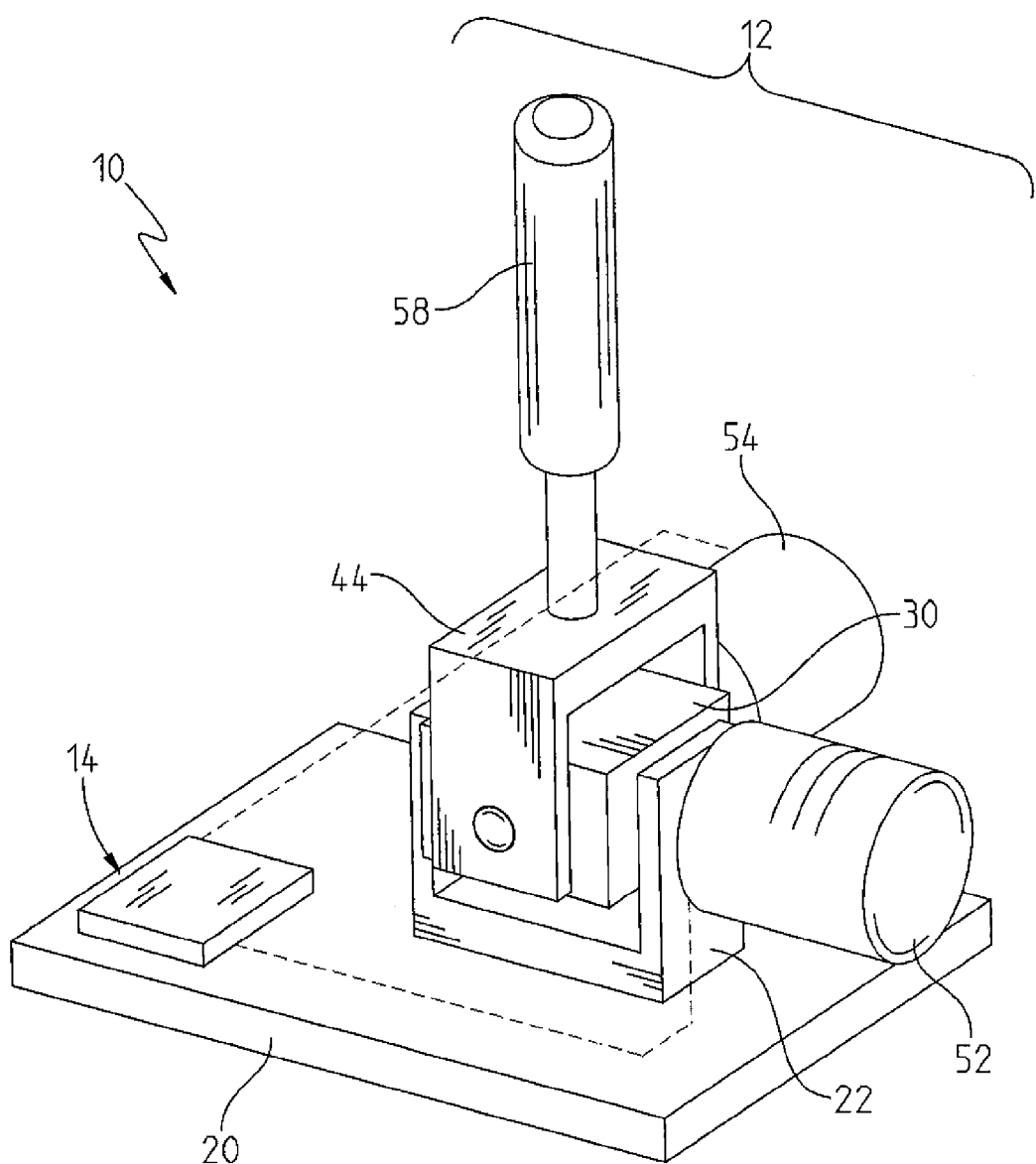
FIG. 1 is a perspective view of the control system.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DESCRIPTION OF THE PREFERRED EMBODIMENTS OF THE INVENTION

The embodiment disclosed below is not intended to be exhaustive or limit the invention to the precise forms disclosed in the following detailed description. Rather, the embodiment is chosen and described so that others skilled in the art may utilize its teachings.

As illustrated by FIG. 1, joystick control system 10 is highlighted. Joystick control system 10 includes user input/joystick 12 and joystick controller 14. Joystick 12 includes base 20, first yoke 22, body 30, second yoke 44, first dashpot 52, second dashpot 54 and handle 58. First yoke 22 is coupled to base 20. Body 30 is pivotally coupled to first yoke 22 and second yoke 44. First dashpot 52 and second dashpot 54 are operably coupled to body 30. First dashpot 52 is coupled to first yoke 22, which is discussed in more detail below. Second dashpot 54 is coupled to second yoke 44, which is also discussed in more detail below. Handle 58 is coupled to second yoke 44. Joystick controller 14 is operably coupled to first and second dashpot 52 and 54 and optionally coupled to base 20, as illustrated in FIG. 1.

Still referring to FIG. 1, first dashpot 52 and second dashpot 54 each include integrated sensors for position (not shown). As described in more detail below, first dashpot 52 and second dashpot 54 are configured to provide the position of handle 58 to joystick controller 14. It is envisioned that dashpots can be of the rotary or linear variety.

Figure 2:
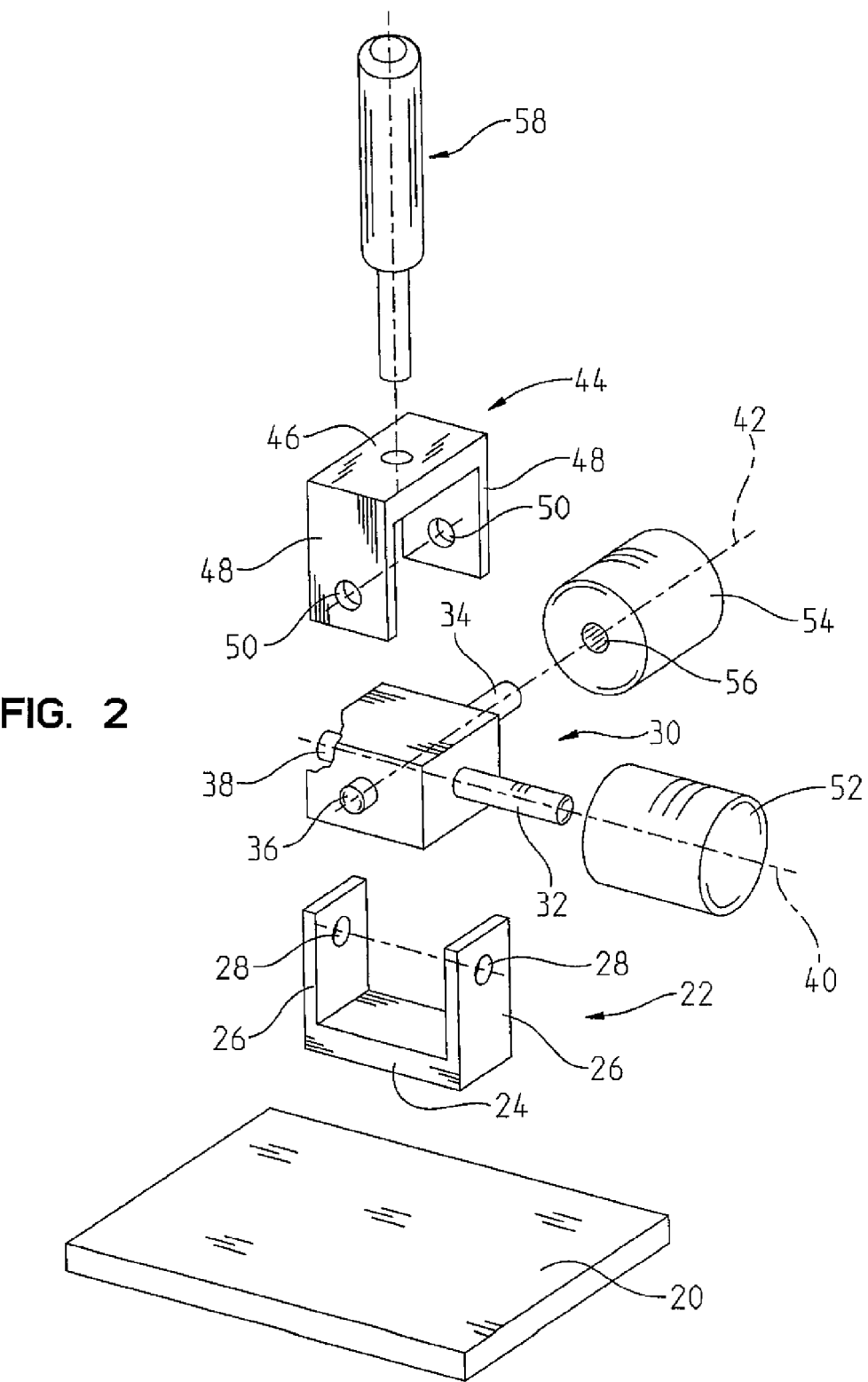
FIG. 2 is an exploded view of the control system.

As illustrated in FIG. 2, first yoke 22 is substantially U-shaped and includes first yoke body 24 and first yoke members 26. As illustrated in FIG. 2, first yoke body 24 is coupled to base 20. As discussed in more detail below, first yoke members 26 each define first yoke apertures 28.

Still referring to FIG. 2, body 30 includes first shaft 32, second shaft 34, first projection 36 and second projection 38. Optionally body 30 is substantially box shaped and/or cube shaped. Optionally first projection 36, second projection 38, first shaft 32 and second shaft 34 lie on a single plane through body 30. Optionally first shaft 32 and second projection 38 extend from opposite sides of body 30 and lie on a first axis 40. Optionally second shaft 34 and first projection 36 extend from opposite sides of body 30 and lie on a second axis 42. Optionally first axis 40 is perpendicular to second axis 42 and optionally first and second axis 40 and 42 form a plane perpendicular to base 20, as illustrated by FIG. 2.

Optionally second projection 38 includes second projection bearings (not shown) where second projection bearings either remain in contact with or in close proximity to the walls of first yoke members 26 defining first yoke apertures 28. Optionally first shaft 32 includes first shaft bearings (not shown) where first shaft bearings either remain in contact with or in close proximity to the walls of first yoke members 26 defining first yoke apertures 28. Optionally first yoke 22 includes first yoke bearings (not shown) where first yoke bearings either remain in contact with or in close proximity to second projection 38 and/or first shaft 32.

Still referring to FIG. 2, second yoke 44 is substantially U-shaped and includes second yoke body 46 and second yoke members 48. As discussed in more detail below, second yoke members 48 each define second yoke apertures 50. Handle 58 is coupled to second yoke body 46 and therefore coupled to second yoke 44.

Optionally first projection 36 includes first projection bearings (not shown) where first projection bearings either remain in contact with or in close proximity to the walls of second yoke members 48 defining second yoke apertures 50. Optionally second shaft 34 includes second shaft bearings (not shown) where second shaft bearings either remain in contact with or in close proximity to the walls of second yoke members 48 defining second yoke apertures 50. Optionally second yoke 44 includes second yoke bearings (not shown) where second yoke bearings either remain in contact with or in close proximity to first projection 36 and/or second shaft 34.

Yet still referring to FIG. 2, first shaft 32 is configured to be slidably disposed within one of first yoke apertures 28 and at least partially disposed within first dashpot 52. Second projection 38 is configured to be slidably disposed within one of first yoke apertures 28. Second shaft 34 is configured to be slidably disposed within one of second yoke apertures 50 and at least partially disposed within second dashpot 54. First projection 36 is configured to be slidably disposed within one of second yoke apertures 50. Therefore, body 30 is coupled to first yoke 22 and rotatable about first axis 40. Therefore, second yoke 44 is coupled to body 30 and rotatable about second axis 42.

Yet still referring to FIG. 2, second dashpot 54 defines second dashpot cavity 56. First dashpot 52 defines a similar cavity (not shown). First dashpot 52 and second dashpot 54 each include MR fluid or ER fluid. Either fluid is used to dampen or dashpot rotary motion of either first shaft 32 or second shaft 34. An exemplary first dashpot 52 or exemplary second dashpot 54 is a 5 Nm TFD RD-2085-01 or a 12 Nm TFD RD-2069-01 each available from Lord Corporation, MR Solutions, Customer Service Department, 406 Gregson Drive, P.O. Box 8012, Cary, N.C. 27511. As previously mentioned, first dashpot 52 and second dashpot 54 are configured to provide the position of handle 58 to joystick controller 14. Joystick controller 14 controls the amount of resistance generated by either first dashpot 52 or second dashpot 54. When handle 58 position reaches a point where a "feel" position is desired, joystick controller 14 causes first dashpot 52 or second dashpot 54 to increase resistance to rotary motion of either first shaft 32 or second shaft 34.

As previously mentioned, first dashpot 52 is coupled to first yoke 22. In operation, rotation of handle 58 about first axis 40 rotates handle 58, second yoke 44, second dashpot 54 and body 30 about first axis 40. First shaft 32 is configured to rotate about first axis 40 while first dashpot 52 does not rotate about first axis 40. First dashpot 52 uses relative rotation of first shaft 32 to dampen or dashpot rotary motion of first shaft 32, and ultimately rotation of handle 58 about first axis 40. Modifying the amount of resistance placed by first dashpot 52 against first shaft 32 allows for feel position, detent position and dashpot position about rotation of first axis 40.

As previously mentioned, second dashpot 54 is coupled to second yoke 44. In operation, rotation of handle 58 about second axis 42 rotates handle 58, second yoke 44 and second dashpot 54 about second axis 42. Second dashpot 54 rotates about second axis 42 while second shaft 34 does not rotate about second axis 42. Second dashpot 54 uses relative rotation of second shaft 34 to dampen or dashpot rotary motion of second dashpot 54, and ultimately handle 58 about second axis 42. Modifying the amount of resistance placed by second dashpot 54 against second shaft 34 allows for feel position, detent position and dashpot position about rotation of second axis 42.

Figure 3:
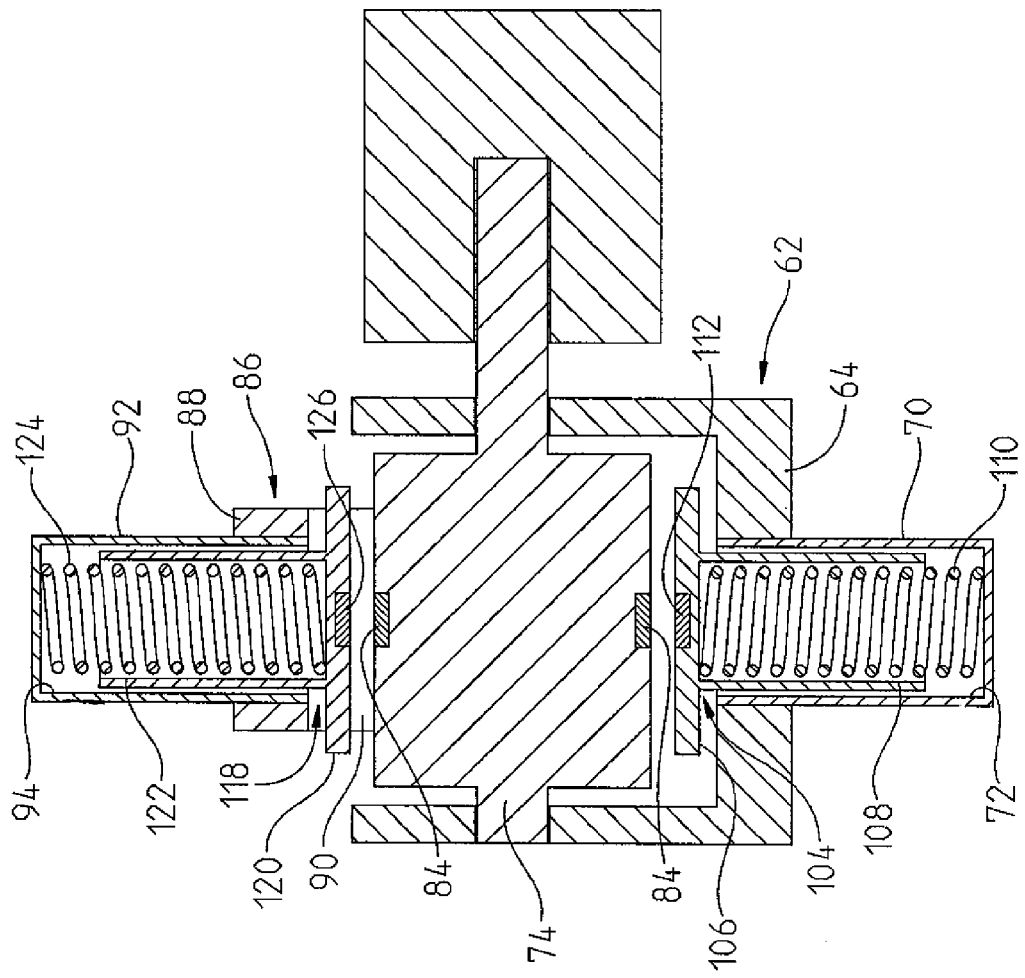
FIG. 3 is a cross-sectional view of another embodiment of the control system.

In FIG. 3, a second embodiment 60 of joystick control system is highlighted. First yoke 62 includes first yoke housing 70 and first yoke centering device 104. First yoke housing 70 defines first yoke cavity 72. First yoke centering device 104 includes first yoke centering plate 106, first yoke centering body 108, first yoke biasing member 110 and first yoke Hall-effect sensor 112. First yoke centering device 104 is at least partially disposed within first yoke cavity 72. First yoke biasing member 110 is also configured to be at least partially disposed within first yoke cavity 72. First yoke Hall-effect sensor 112 is supported by first yoke centering plate 106.

Still referring to FIG. 3, second yoke 86 includes second yoke housing 92 and second yoke centering device 118. Second yoke housing 92 defines second yoke cavity 94. Second yoke centering device 118 includes second yoke centering plate 120 and second yoke centering body 122, second yoke biasing member 124 and second yoke Hall-effect sensor 126. Second yoke centering device 118 is at least partially disposed within second yoke cavity 94. Second yoke biasing member 124 is also configured to be at least partially disposed within second yoke cavity 94. Second yoke Hall-effect sensor 126 is supported by second yoke centering plate 120.

As illustrated in FIG. 3, first yoke centering body 108 is configured to be at least partially disposed within first yoke cavity 72. Furthermore, first yoke biasing member 110 is configured to bias first yoke centering plate 106 towards body 74 and away from first yoke cavity 72. The bias of first yoke centering plate 106 against body 74 is used to position body 74 in relation to first yoke 62. Similarly, second yoke centering body 122 is configured to be at least partially disposed within second yoke cavity 94. Second yoke biasing member 124 is configured to bias second yoke centering plate 120 towards body 74 and away from second yoke cavity 94. The bias of second yoke centering plate 120 against body 74 is used to position second yoke 86 in relation to body 74. The operation of centering devices 104 and 118 are used to position joystick control system 60.

Yet still referring to FIG. 3, optionally body 74 includes magnets 84. Preferably magnets 84 are close to centering plates 106 and 120 and most preferably magnets 84 are operably close to first yoke Hall-effect sensor 112 and second yoke Hall-effect sensor 126. Optionally joystick controller 14 (FIG. 1) is operably coupled to first yoke Hall-effect sensor 112 and second yoke Hall-effect sensor 126. Optionally first yoke Hall-effect sensor 112 and second yoke Hall-effect sensor 126 provide the position of handle 58 to joystick controller 14.

Figure 4:
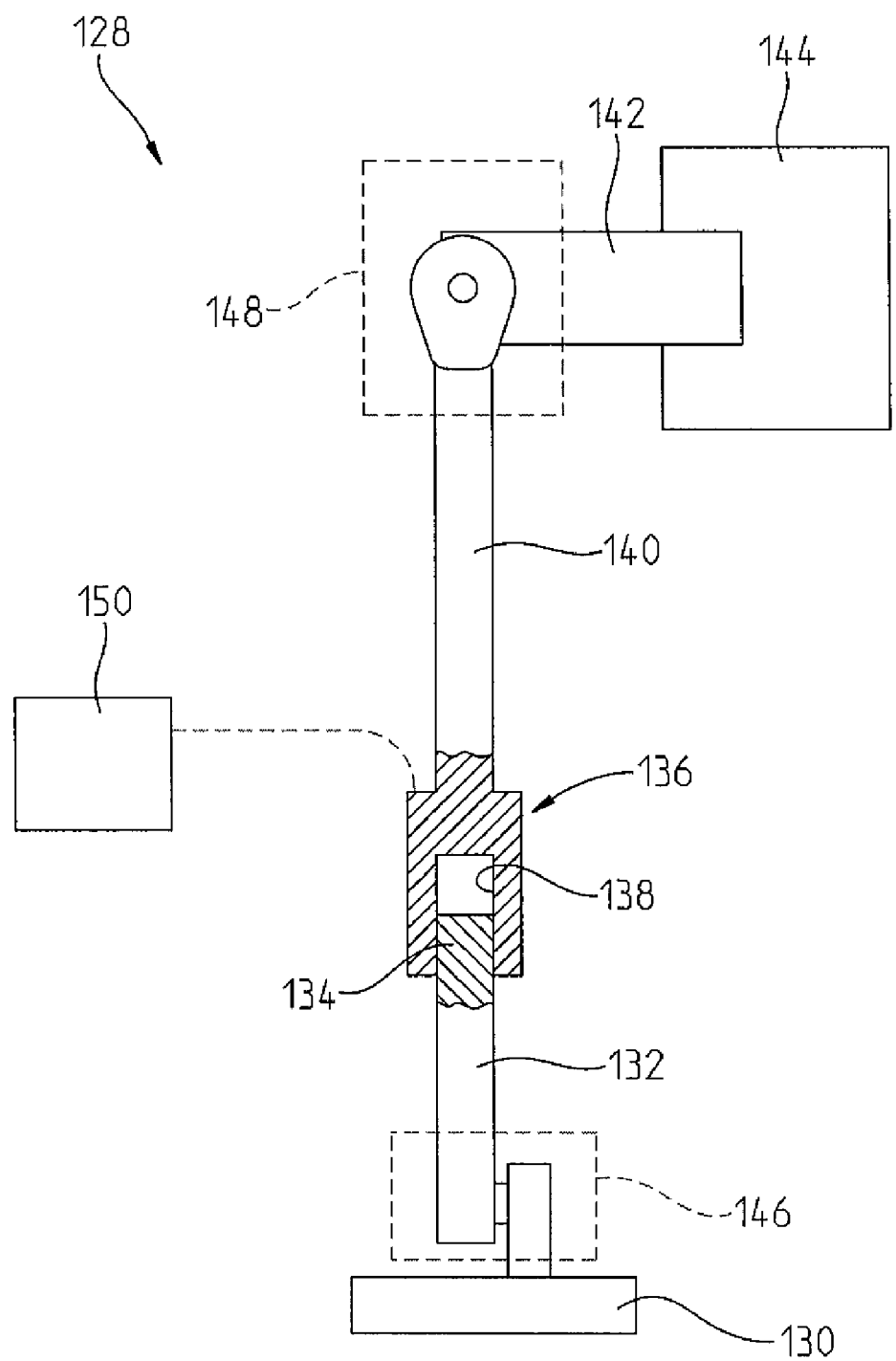
FIG. 4 is a perspective view of the control system with a partial cross sectional view.

Referring to FIG. 4, control system 128 is shown. Control system 128 includes user input/lever 130, first rod 132, third dashpot 136, second rod 140, valve 144 and system controller 150. As illustrated by FIG. 4, lever 130 is operably coupled to first rod 132 by lever coupler 146. It is envisioned that operational coupling could occur by any suitable coupler, such as a joint or hinge. First rod 132 includes first end 134. FIG. 4 also shows system controller 150 operably coupled to third dashpot 136, which is discussed in more detail below.

Discussed in more detail below, first rod 132 is configured to be disposed within dashpot cavity 138. Third dashpot 136 is coupled to second rod 140. As illustrated in FIG. 4, second rod 140 is operably coupled to third rod 142 through rod coupler 148. It is envisioned that second rod 140 is operably coupled to valve 144 by any other suitable coupler, such as a joint or a hinge. It is also envisioned that control system 128 optionally includes third rod 142.

Still referring to FIG. 4, third dashpot 136 defines dashpot cavity 138. Third dashpot 136 includes either MR fluid or ER fluid. Either fluid is used to dampen or operably disengage lever 130 from valve 144. An exemplary embodiment of third dashpot 136 is RD-1005-3 available from Lord Corporation, MR Solutions, Customer Service Department, 406 Gregson Drive, P.O. Box 8012, Cary, N.C. 27511.

Third dashpot 136 at least partially encloses first end 134 of first rod 132. System controller 150 commands third dashpot 136 to apply a magnetic or electric field. An applied magnetic field to MR fluid or an applied electric field to ER fluid operably couples lever 130 to actuate valve 144. Optionally system controller 150 can lock into commanding (i.e. continually command) third dashpot 136 to apply either field. In other words, system controller 150 optionally has a locking action which will continually command third dashpot 136 to apply either the magnetic field or the electric field. The locking action can be released by physical means, for example a switch, or by overcoming the locking force. System controller 150 also commands third dashpot 136 to apply a partial magnetic or a partial electric field. A partial magnetic or electric field operably dampens coupling of lever 130 and valve 144. System controller 150 is configured to command dampening from third dashpot 136. System controller 150 yet also commands third dashpot 136 to remove the magnetic or electric field. A lack of magnetic or electric field operably disengages lever 130 from valve 144.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A control system for a vehicle comprising:
   a user input configured for movement by an operator of the vehicle;
   a dashpot including either a MR fluid or an ER fluid, the dashpot operably coupled to the user input to apply a resistance to movement of the user input; and
   a controller operably coupled to the dashpot, the controller controlling actuation of the dashpot based on the position of the user input by application of either a magnetic field to the MR fluid or an electric field to the ER fluid to control the resistance applied by the dashpot to movement of the user input.

2. The control system of claim 1 wherein the dashpot applies the resistance to rotary movement of the user input.

3. The control system of claim 1 wherein the dashpot applies the resistance to linear movement of the user input.

4. The control system of claim 1 wherein the user input comprises a lever and the vehicle further includes a rod coupled to the dashpot.

5. The control system of claim 4 wherein the controller is configured to command the dashpot to apply no magnetic field to the MR fluid or no electric field to the ER fluid to operably disengage the lever from the rod.

6. The control system of claim 4 wherein the dashpot is configured to provide an input to the controller.

7. The control system of claim 6 wherein the controller operably decouples the lever from the rod based on the input from the dashpot.

8. The control system of claim 4 wherein the controller is configured to command the dashpot to apply a partial magnetic field to the MR fluid or a partial electric field to the ER fluid to partially disengage the lever from the rod.

9. The control system of claim 4 wherein the controller is configured to lock into commanding the dashpot to partially disengage the lever from the rod.

10. The control system of claim 4 wherein the lever is configured to disengage the rod by a physical mechanism or an overcoming force.

11. The control system of claim 4 wherein the lever does not operate the valve when the controller decouples the lever and the rod.

12. The control system of claim 1 wherein the user input comprises a joystick.

13. The control system of claim 12 wherein the controller is configured to command the dashpot to increase the resistance applied to movement of the joystick when the joystick is in a feel position.

14. The control system of claim 12 wherein the controller is configured to command the dashpot to increase the resistance applied to movement of the joystick to provide a detent position for the joystick.

15. The control system of claim 12 further including at least one magnet and at least one Hall-effect sensor, the at least one Hall-effect sensor configured to detect the at least one magnet to provide input to the controller on the position of the joystick.

16. The control system of claim 12 further including centering devices configured to position the joystick.

17. A control system for a vehicle comprising:
   a user input configured for movement by an operator of the vehicle;
   a position sensor configured to detect the position of the user input;
   a dashpot including either a MR fluid or an ER fluid, the dashpot operably coupled to the user input to apply a resistance to movement of the user input; and
   a controller operably coupled to the dashpot and to the position sensor, the controller configured to control the dashpot based on the position of the user input detected by the position sensor to control the resistance applied by the dashpot to movement of the user input.

18. The control system of claim 17 wherein the dashpot applies the resistance to rotary movement of the user input about a first axis.

19. The control system of claim 17 wherein the dashpot applies the resistance to linear movement of the user input.

20. The control system of claim 18 further including a second dashpot that applies a second resistance to rotary movement of the user input about a second axis.

21. The control system of claim 20 wherein the second axis is perpendicular to the first axis.

22. The control system of claim 17 wherein the position sensor is integrated with the dashpot.

23. The control system of claim 17 wherein the user input includes one of a lever and a joystick.

* * * * *